(12) United States Patent
Chen et al.

(10) Patent No.: US 12,436,565 B2
(45) Date of Patent: Oct. 7, 2025

(54) SMART RING AND CONTROL METHOD THEREOF

(71) Applicant: WUYING TECHNOLOGY (GUANGDONG) CO., LTD, Guangdong (CN)

(72) Inventors: Jingqi Chen, Guangdong (CN); Haifeng Chen, Guangdong (CN)

(73) Assignee: WUYING TECHNOLOGY (GUANGDONG) CO., LTD, Guangdong (CN)

( * ) Notice: Subject to any disclaimer, the term of this patent is extended or adjusted under 35 U.S.C. 154(b) by 0 days.

(21) Appl. No.: 18/842,049

(22) PCT Filed: Nov. 3, 2022

(86) PCT No.: PCT/CN2022/129524
§ 371 (c)(1),
(2) Date: Aug. 28, 2024

(87) PCT Pub. No.: WO2023/160007
PCT Pub. Date: Aug. 31, 2023

(65) Prior Publication Data
US 2025/0181111 A1    Jun. 5, 2025

(30) Foreign Application Priority Data

Feb. 28, 2022 (CN) .......................... 202210185937.5
Feb. 28, 2022 (CN) .......................... 202220411920.2

(51) Int. Cl.
G06F 1/16    (2006.01)
G06F 3/01    (2006.01)

(52) U.S. Cl.
CPC ............ *G06F 1/163* (2013.01); *G06F 1/1635* (2013.01); *G06F 1/1637* (2013.01); *G06F 1/1698* (2013.01); *G06F 3/011* (2013.01)

(58) Field of Classification Search
CPC ... A44C 9/0053; A61B 5/6826; A61B 5/7455; A61B 2560/0209; A61B 2560/029;
(Continued)

(56) References Cited

U.S. PATENT DOCUMENTS 9,582,076 B2 *  2/2017  Kienzle .................. G06F 3/017
10,520,378 B1  12/2019  Brown et al.
(Continued)

FOREIGN PATENT DOCUMENTS

CN    106155274    11/2016
CN    106235539    12/2016
(Continued)

OTHER PUBLICATIONS

"International Search Report (Form PCT/ISA/210) of PCT/CN2022/129524", mailed on Jan. 20, 2024, with English translation thereof, pp. 1-6.

*Primary Examiner* — Nelson M Rosario
(74) *Attorney, Agent, or Firm* — JCIPRNET

(57) ABSTRACT

The present invention provides a smart ring and a control method thereof. The smart ring includes a body, a circuit board, and a battery. The body includes an annular accommodating cavity. The circuit board is arranged in the accommodating cavity, the circuit board includes a microprocessor and a vibration sensor, an inertial sensor, and a wireless communication module that are all electrically connected with the microprocessor, and the wireless communication module is communicatively connected with an external electrical device. The battery is connected to the circuit board. By arranging the vibration sensors, the inertial sensor, and the wireless communication module, a corresponding control instruction can be obtained based on a signal sensed by the vibration sensor and/or a signal sensed by the inertial (Continued)

sensor, to control an external electrical device to operate, so that the smart ring has more diversified functions.

18 Claims, 15 Drawing Sheets

(58) Field of Classification Search
CPC ... A61B 5/01; A61B 5/02438; A61B 5/14551; G06F 1/16
See application file for complete search history.

(56) References Cited

U.S. PATENT DOCUMENTS

2011/0007035 A1\* 1/2011 Shai ................ G06F 3/0304
345/179
2022/0190082 A1\* 6/2022 Li ................ H10K 59/1213

FOREIGN PATENT DOCUMENTS

| | | |
|---|---|---|
| CN | 206560101 | 10/2017 |
| CN | 107678542 | 2/2018 |
| CN | 109144296 | 1/2019 |
| CN | 211882562 | 11/2020 |
| CN | 112506354 | 3/2021 |
| CN | 113741699 | 12/2021 |
| CN | 114631672 | 6/2022 |
| CN | 217408024 | 9/2022 |
| WO | 2017156633 | 9/2017 |

\* cited by examiner

SMART RING AND CONTROL METHOD THEREOF

CROSS-REFERENCE TO RELATED APPLICATION

This application is a 371 of international application of PCT application serial no. PCT/CN2022/129524, filed on Nov. 3, 2022, which claims the priority benefit of China applications serial no. 202210185937.5 and Ser. No. 202220411920.2 filed on Feb. 28, 2022. The entirety of each of the above-mentioned patent applications is hereby incorporated by reference herein and made a part of this specification.

TECHNICAL FIELD

The present invention relates to a wearable device, and in particular, to a smart ring and a control method thereof.

BACKGROUND

Rings are common ornaments usually worn on fingers for decoration. With the development of technologies, rings originally for decoration purposes only have gradually developed into smart rings with the integration of various intelligent functions. In related technologies, some smart rings can monitor the user's body temperature, heart rate, and other status data, and some smart rings can interact with electrical devices such as mobile phones, home appliances, and vehicles.

However, smart rings in related technologies still have the following deficiencies:

1. In a smart ring in related technologies, a touch area or a button structure is usually arranged on an outer surface of the smart ring, and when the touch area is touched or a button is pressed, a corresponding control instruction is sent, thus realizing interaction with an electrical device such as a home appliance. The arrangement of the touch area and the button structure increases structural complexity of the smart ring, leading to increased manufacturing costs. The small size of the smart ring makes it inconvenient for the user to operate on the touch area or the button structure with a finger, and is prone to erroneous operations. In addition, such arrangement is likely to result in the formation of a structure protruding from the outer surface of the smart ring, affecting the aesthetics.
2. Smart rings in related technologies usually have a round inner hole, which does not exactly match the shape of the finger, leading to a gap between the smart ring and the finger. As a result, data measured by a sensor arranged in the smart ring may be inaccurate due to the gap between the smart ring and the finger, affecting accuracy of monitoring of human body data by the smart ring. In addition, smart rings in related technologies easily rotate relative to the finger, leading to inconvenience during use. For example, when a smart ring with a display apparatus such as a display screen or an indicator light is worn, the position of the display apparatus is easily changed due to rotation of the smart ring, and the user needs to rotate the smart ring in order to view the display screen or the indicator light, making it inconvenient to view the smart ring. For another example, after the smart ring is rotated, the position of the sensor in the smart ring is also changed, resulting in differences in data measurement, which is not conducive to maintaining accuracy and consistency of measurement results.
3. Because a large number of sensors and other electronic components need to be integrated inside the smart ring, smart rings in related technologies are large in size, and some rings may be equipped with an additional decorative panel which protrudes outward to provide space for mounting of the electronic components, making the smart rings uncomfortable to wear, inconvenient to operate, and not aesthetic.

Therefore, it is necessary to improve the prior art to overcome the deficiencies in the prior art.

SUMMARY OF INVENTION

The present invention aims to provide a smart ring and a control method thereof. The smart ring has a simpler structure, and is more convenient to operate.

To achieve the objective of the present invention, according to a first aspect, the present invention provides a smart ring, including:
  a body, including an annular accommodating cavity;
  a circuit board, arranged in the accommodating cavity, the circuit board including a microprocessor and a vibration sensor, an inertial sensor, and a wireless communication module that are electrically connected to the microprocessor, the wireless communication module being communicatively connected with an external electrical device, and the microprocessor being configured to obtain a corresponding control instruction based on a signal generated by the vibration sensor and/or a signal generated by the inertial sensor; and
  a battery, connected to the circuit board.

Further, the body includes an inner housing and an outer housing surrounding an outer circumference of the inner housing, and the accommodating cavity is formed between the inner housing and the outer housing.

Further, the inner housing is provided with a boss protruding toward a central hole of the inner housing.

Further, the boss includes an upper surface configured for contact with a finger pad of a finger, and the upper surface is a planar surface.

Further, the smart ring further includes one or more protrusions protruding toward the central hole, and the one or more protrusions are configured for contact with a side surface or a top surface of a finger.

Further, the circuit board further includes an optical sensor arranged corresponding to the boss, and the boss is provided with a window through which light of the optical sensor passes.

Further, the circuit board further includes a charging module arranged corresponding to the boss, and a charging port corresponding to an electrode of the charging module is provided on a surface of the boss.

Further, the circuit board further includes a display apparatus electrically connected to the microprocessor.

Further, an upper surface of the boss is configured to fit with a finger pad of a finger; and
  the display apparatus has a first symmetrical plane passing through a central axis of the body, and the boss has a second symmetrical plane passing through the central axis of the body, and an angle A between the first symmetrical plane and the second symmetrical plane ranges from 90° to 180°.

Further, the angle A between the first symmetrical plane and the second symmetrical plane ranges from 120° to 160°.

Further, the smart ring further includes a decorative housing surrounding an outer circumference of the body, the body is provided with a first clearance hole, the decorative housing is provided with a second clearance hole, and the display apparatus is located in the first clearance hole and the second clearance hole.

Further, the circuit board further includes a storage module electrically connected to the microprocessor, and the storage module is configured to store control instructions corresponding to signals sensed by the vibration sensor and the inertial sensor.

Further, the circuit board further includes an actuator electrically connected to the microprocessor, and the actuator is configured to vibrate according to an instruction of the microprocessor; or the vibration sensor is a piezoelectric ceramic sensor, and the piezoelectric ceramic sensor is configured to vibrate according to an instruction of the microprocessor.

Further, the battery includes an arc-shaped housing, a core arranged in the arc-shaped housing, an end cover connected to an end of the arc-shaped housing, and an electrode assembly electrically connected to the core, and the electrode assembly is connected to the end cover.

Further, the end cover is provided with a convex ring in communication with an inner cavity of the arc-shaped housing, and the electrode assembly includes a glass ring provided within the convex ring and an electrode arranged within the glass ring.

Further, the end cover is laser-welded to the arc-shaped housing, the end cover is provided with a through hole, the end cover is provided with an inner surface facing an inner cavity of the arc-shaped housing, the electrode assembly includes an adhesive layer connected to the inner surface and an electrode connected to the adhesive layer, the electrode includes a plate body and an electrode post protruding from the plate body, and the electrode post is inserted in the through hole.

Further, a distance between an outer edge of the adhesive layer and an outer edge of the end cover is greater than or equal to 0.1 mm.

According to a second aspect, the present invention provides a control method of a smart ring, including the following steps:

obtaining a vibration signal generated by a vibration sensor;

obtaining a corresponding control instruction based on the vibration signal; and sending the control instruction to an external electrical device.

Further, the control method of the smart ring further includes the following steps:

obtaining a feedback signal of the external electrical device; and obtaining a corresponding vibration control instruction based on the feedback signal, and controlling the smart ring to vibrate.

According to a third aspect, the present invention provides a control method of a smart ring. The smart ring includes a low power consumption state and an operating state, and the control method of the smart ring includes the following steps:

in the low power consumption state, obtaining, by using a microprocessor, a vibration signal generated by a vibration sensor;

determining, by the microprocessor based on the vibration signal, whether a corresponding control instruction is a wake-up instruction, and if yes, switching to the operating state;

in the operating state, obtaining, by the microprocessor, a signal generated by the vibration sensor and/or a signal generated by an inertial sensor; and obtaining, by the microprocessor, a corresponding control instruction based on the signals, and sending the control instruction to an external electrical device through a wireless communication module.

In comparison with the prior art, the present invention has the following beneficial effects:

1. By arranging the vibration sensors, the inertial sensor, and the wireless communication module, corresponding a control instruction can be obtained based on a signal sensed by the vibration sensor and/or a signal sensed by the inertial sensor, to control the smart ring or an external electrical device to operate, so that the smart ring has more diversified functions. In addition, the vibration sensor can be used to replace the traditional button or touchscreen, and has a simpler structure, which is conducive to miniaturization of the smart ring. The control instruction can be sent by tapping the ring and/or moving the ring, and the operation is more convenient.

2. In an improvement, the body of the smart ring is provided with a boss, which can make the smart ring more firmly fixed on the finger, and the smart ring hardly rotates relative to the finger, so that positions of components such as the sensor do not change easily, and it is conducive to improving measurement accuracy. In addition, the boss increases space of a corresponding part of the accommodating cavity, which can facilitate installation of electronic components. When operation or display elements such as a button and a display apparatus are arranged on the surface of the smart ring, the stability of the position of the smart ring is conducive to improving the convenience of operating the smart ring.

3. In an improvement, the electrode of the battery is separated from the convex ring of the end cover by the glass ring, which is conducive to ensuring insulation performance between the electrode and the end cover, and improving connection strength of the electrode.

4. In an improvement, the electrode of the battery is separated from the end cover by the adhesive layer. The adhesive layer plays an insulating role and makes the connection between the electrode and the end cover more convenient. Further, the distance between the outer edge of the adhesive layer and the outer edge of the end cover is set to greater than or equal to 0.1 mm, which is conducive to reducing the impact on the adhesive layer when the end cover is welded.

DESCRIPTION OF EMBODIMENTS

In order to make the foregoing objectives, features, and advantages of this application clearer and easier to understand, specific embodiments of this application are described in detail below with reference to the accompanying drawings. It may be understood that, the embodiments described herein are merely used for explaining this application, but are not intended to limit this application. In addition, it should be noted that, for ease of description, the accompanying drawings show only parts relevant to this application rather than all structures. All other embodiments obtained by a person skilled in the art based on the embodiments of this application without creative efforts shall fall within the protection scope of this application.

In this application, terms "include", "have", and any variant thereof are intended to cover a non-exclusive inclusion. For example, a process, method, system, product, or device that includes a series of steps or units is not limited to the listed steps or units; and instead, further optionally includes a step or unit that is not listed, or further optionally includes another step or unit that is intrinsic to the process, method, product, or device.

"Embodiment" mentioned in this specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in this specification may be combined with other embodiments.

FIG. 1 to FIG. 6 correspond to a smart ring according to a preferred embodiment of the present invention. The smart ring includes a body 1 and a circuit board 3 and a battery 4 that are disposed in the body 1.

Figure 2:
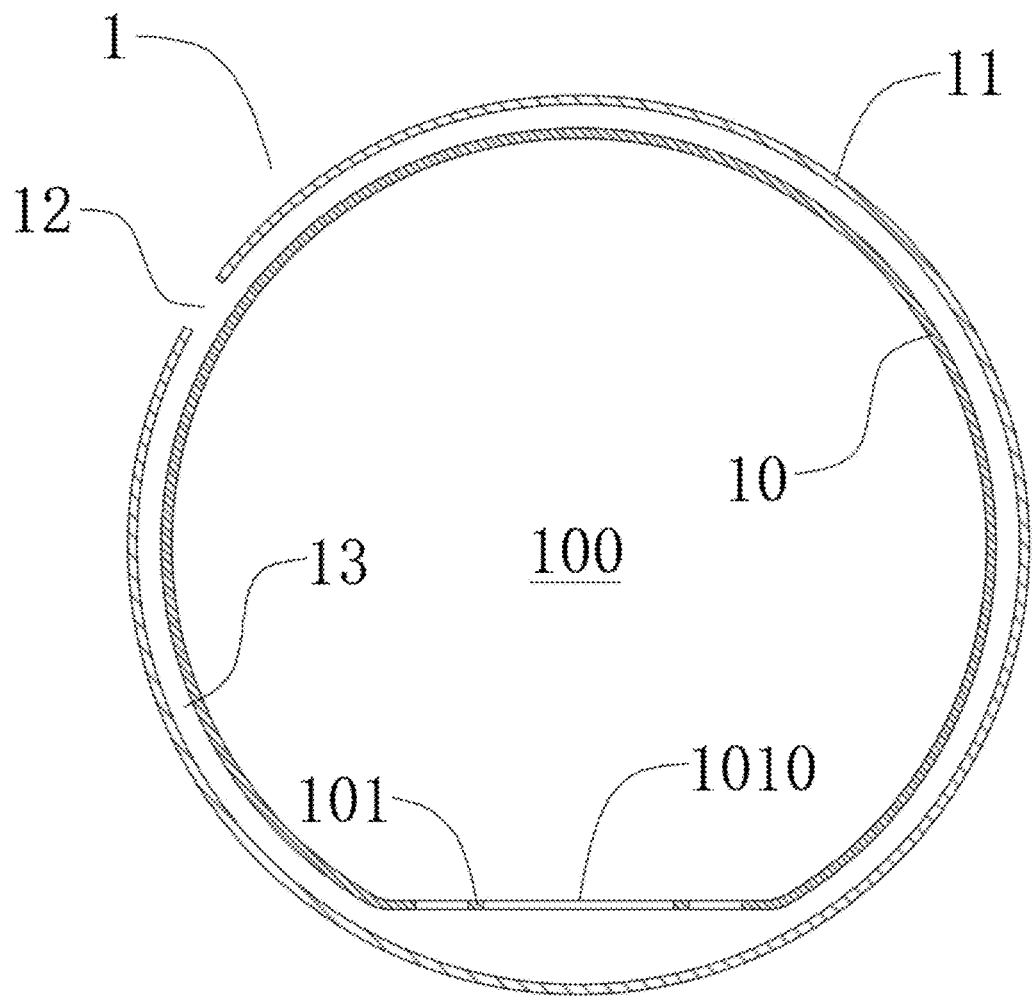
FIG. 2 is a cross-sectional view of a body according to an embodiment of the present invention.
Figure 3:
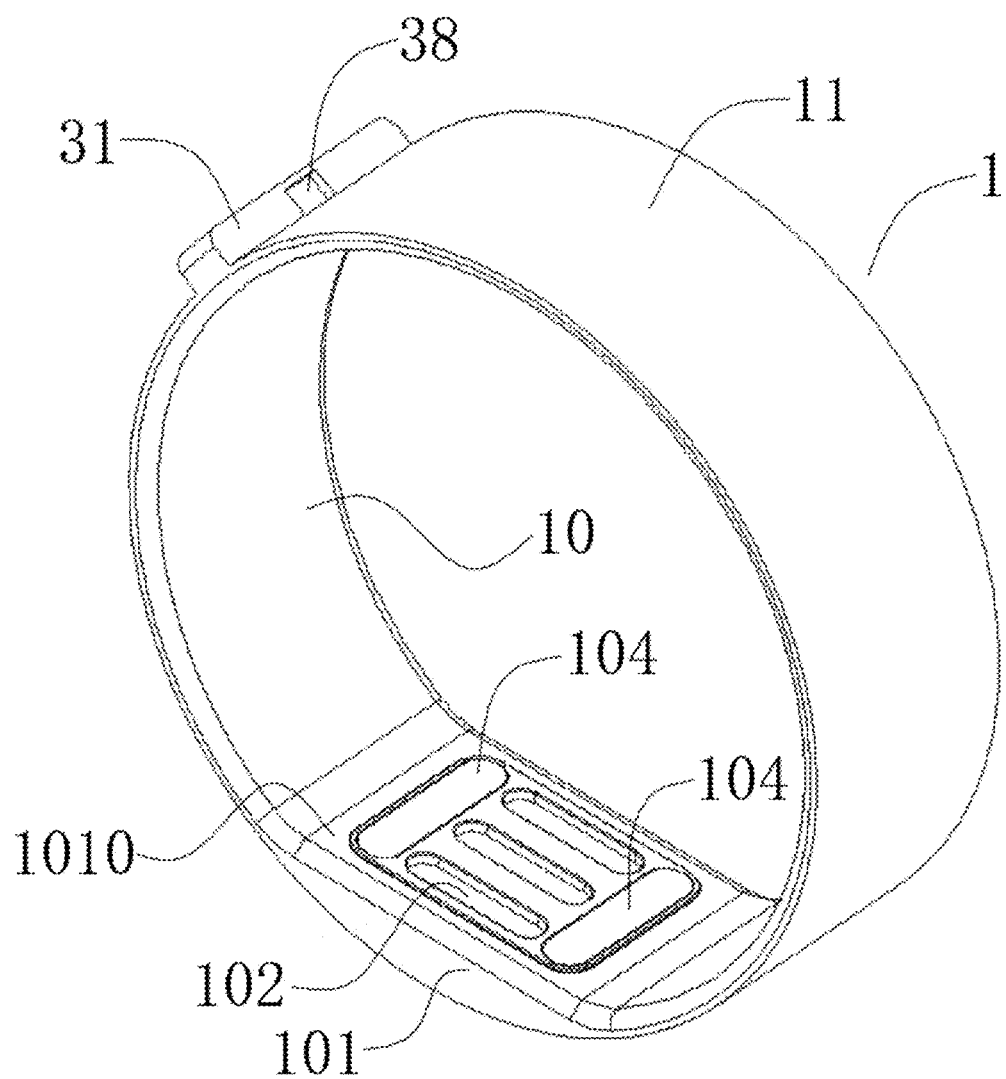
FIG. 3 is a schematic structural diagram of a smart ring according to an embodiment of the present invention.

Referring to FIG. 2 and FIG. 3, the body 1 is generally in an annular shape, and an annular accommodating cavity 13 is formed inside the body 1 to serve as accommodating space for the circuit board 3 and the battery 4. In a preferred embodiment, the body 1 includes an inner housing 10 and an outer housing 11 surrounding an outer circumference of the inner housing 10, the inner housing 10 and the outer housing 11 are connected to form the body 1, and the foregoing annular accommodating cavity 13 is formed between the inner housing 10 and the outer housing 11.

Figure 4:
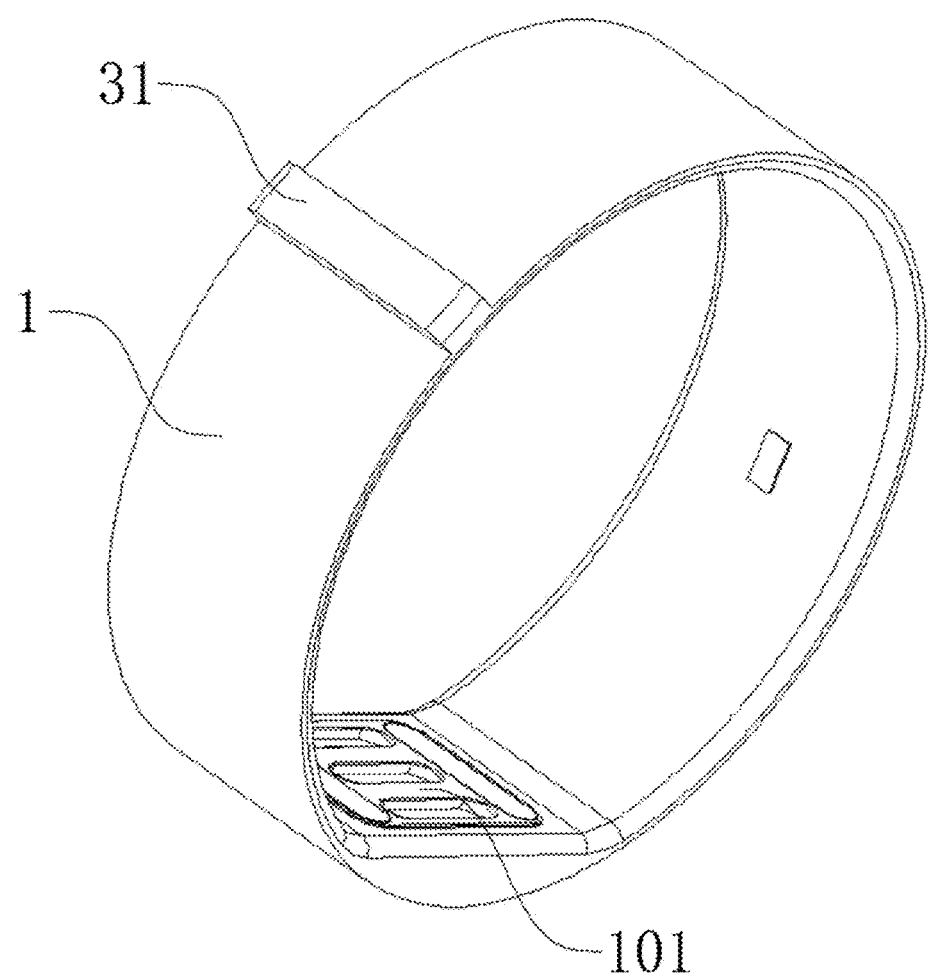
FIG. 4 is a schematic structural diagram of the smart ring in FIG. 3 from another view.
Figure 5:
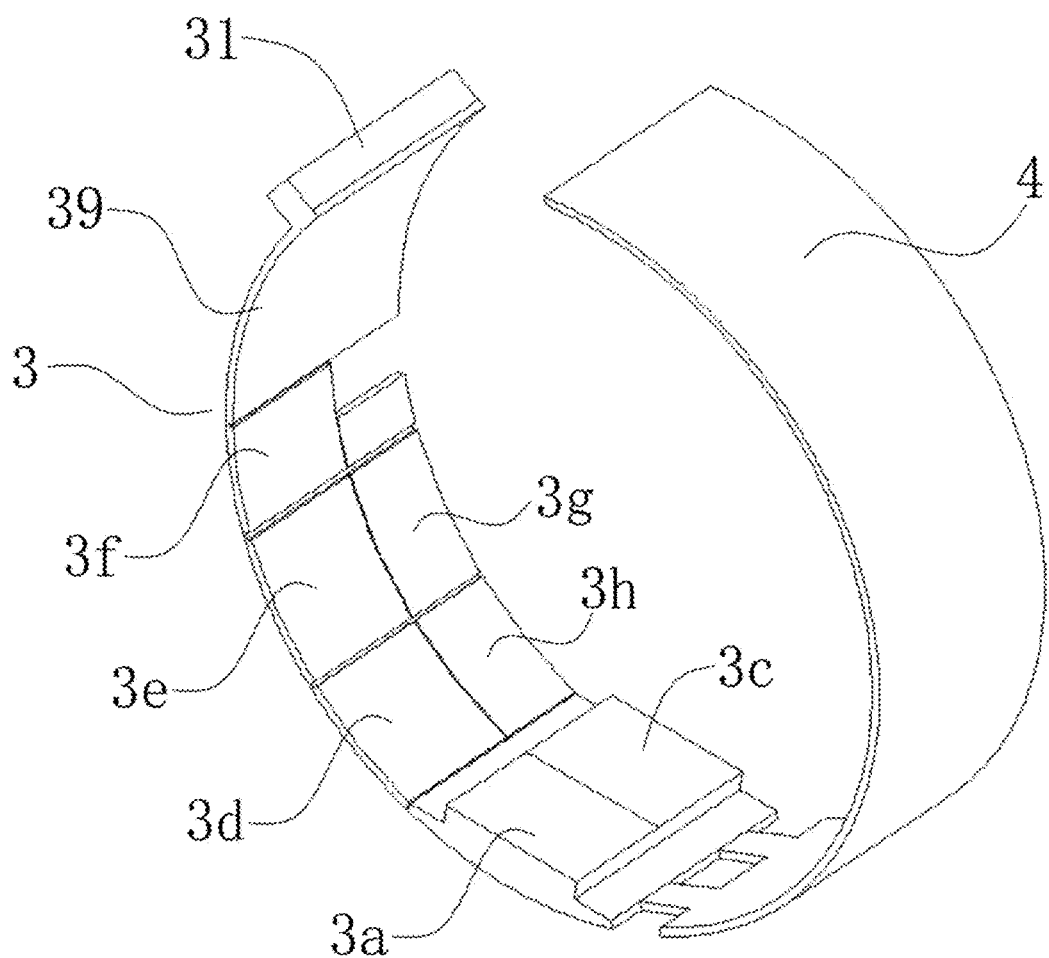
FIG. 5 is a schematic diagram of a connection between a circuit board and a battery according to an embodiment of the present invention.
Figure 6:
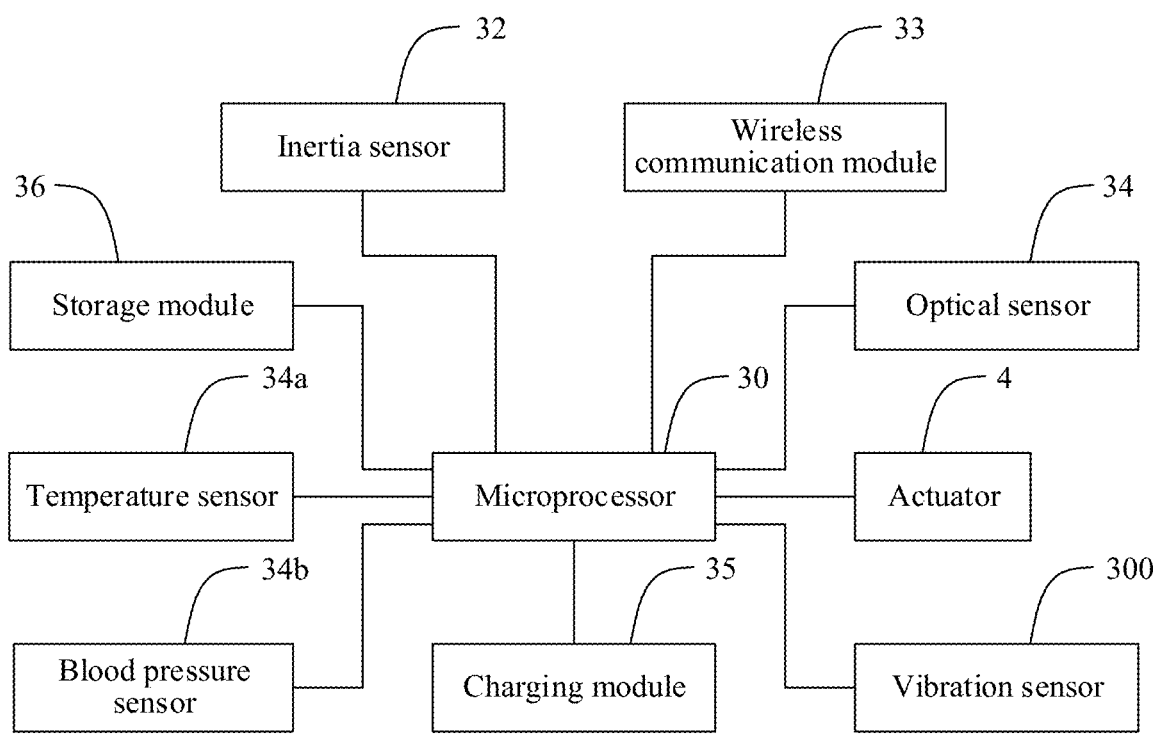
FIG. 6 is a block diagram of modules of a smart ring according to an embodiment of the present invention.

Referring to FIG. 4 to FIG. 6, the circuit board 3 includes a plate body 39 and a microprocessor 30, a vibration sensor 300, an inertial sensor 32, and a wireless communication module 33 that are all arranged on the plate body 39. The plate body is provided with a circuit to connect various electronic components on the circuit board 3, for example, to enable the vibration sensor 300, the inertial sensor 32, and the wireless communication module 33 all to be electrically connected to the microprocessor 50. The circuit board 3 is preferably a flexible circuit board, to be bent into a circular arc shape and to be conveniently placed in the accommodating cavity 13. The circuit board 3 is connected to the battery 4 and is powered by the battery 4.

The wireless communication module 33 is configured to communicatively connect to external electrical devices. For example, the external electrical devices may be electronic devices such as a mobile phone, a tablet, a notebook, and a computer; or household appliances such as a television, a stereo, an air conditioner, and a washing machine; or other electrical devices such as a car door and a car central control. The smart ring and the electrical device can communicate with each other through the wireless communication module 33, thereby sending an instruction to the electrical device or receiving feedback signals from the electrical device. The wireless communication module 33 may be a Bluetooth module for example.

The vibration sensor 300 is configured to detect a vibration received by the smart ring, and the microprocessor 30 can obtain a corresponding control instruction based on the vibration signal sensed by the vibration sensor 300. For example, tapping the smart ring may generate a vibration signal, and a frequency, a wavenumber, and a peak value of the vibration signal may be correspondingly changed with change of a frequency, a number of times, and strength of tapping the smart ring. The microprocessor 30 obtains the corresponding control instruction based on the vibration signal. For example, a vibration signal generated by tapping once may correspond to a control instruction for waking up the smart ring, a vibration signal generated by tapping twice quickly may correspond to a control instruction indicating confirmation, a vibration signal generated by tapping twice slowly may correspond to a control instruction for unlocking/locking a car door, and the like.

For example, the inertial sensor 32 may be a gyroscope capable of detecting a trajectory signal of the smart ring. When the smart ring is worn on a finger and the smart ring is moved by using a gesture, the inertial sensor 32 senses the trajectory signal, and the microprocessor 30 may obtain a corresponding control instruction based on the received trajectory signal. For example, quickly moving the smart ring to the right may indicate playing the next song, and the microprocessor 30 may obtain, based on the trajectory signal of the inertial sensor 32, a control instruction for playing the next song; and quickly moving the smart ring to the left may indicate playing the previous song and the microprocessor 30 may obtain, based on the trajectory signal of the inertial sensor 32, a control instruction for playing the previous song.

The control instruction obtained by the microprocessor 30 may selectively be transmitted by the wireless communication module 33, to control the electrical device to perform a corresponding action.

The vibration sensor 300 is arranged to implement the function of a traditional touchscreen or button instead, thereby simplifying the structure of the smart ring, reducing the volume of the smart ring, and making it more aesthetic. In addition, this also makes the smart ring does not easily send operation instructions by mistake. For example, when the smart ring is not tapped, the smart ring may be in a low power consumption state or a state in which the trajectory signal is shielded. In this case, the microprocessor 30 does not feed back to the trajectory signal, and the smart ring does not send a control instruction when being moved. The microprocessor 30 generates a control instruction based on the trajectory signal of the inertial sensor 32 only when the smart ring is tapped according to a preset rule for generating a vibration signal. In this way, the smart ring can be effectively prevented from sending a control instruction by mistake when being moved without control intention.

To facilitate the microprocessor 30 to obtain the control instruction corresponding to the vibration signal or the trajectory signal, the circuit board 3 further includes a storage module 36 electrically connected to the microprocessor 30. Control instructions corresponding to the vibration signal and the trajectory signal are stored in the storage module 36, and for example, there may be a mapping relationship between the control instructions corresponding to the two signals. After the microprocessor 30 obtains a vibration signal, a control instruction corresponding to the vibration signal may be obtained from the storage module 36 through mapping, thereby performing a corresponding control function. Similarly, after the microprocessor 30 obtains a trajectory signal, a control instruction corresponding to the trajectory signal may be obtained from the storage module 36, thereby performing a corresponding control function. It is clear that manners in which the microprocessor 30 obtains the corresponding control instructions are not limited thereto.

To enable the smart ring to detect physiological parameters of a human body, the smart ring may further include a sign detection sensor, thereby being able to monitor a health status of the human body.

Figure 1:
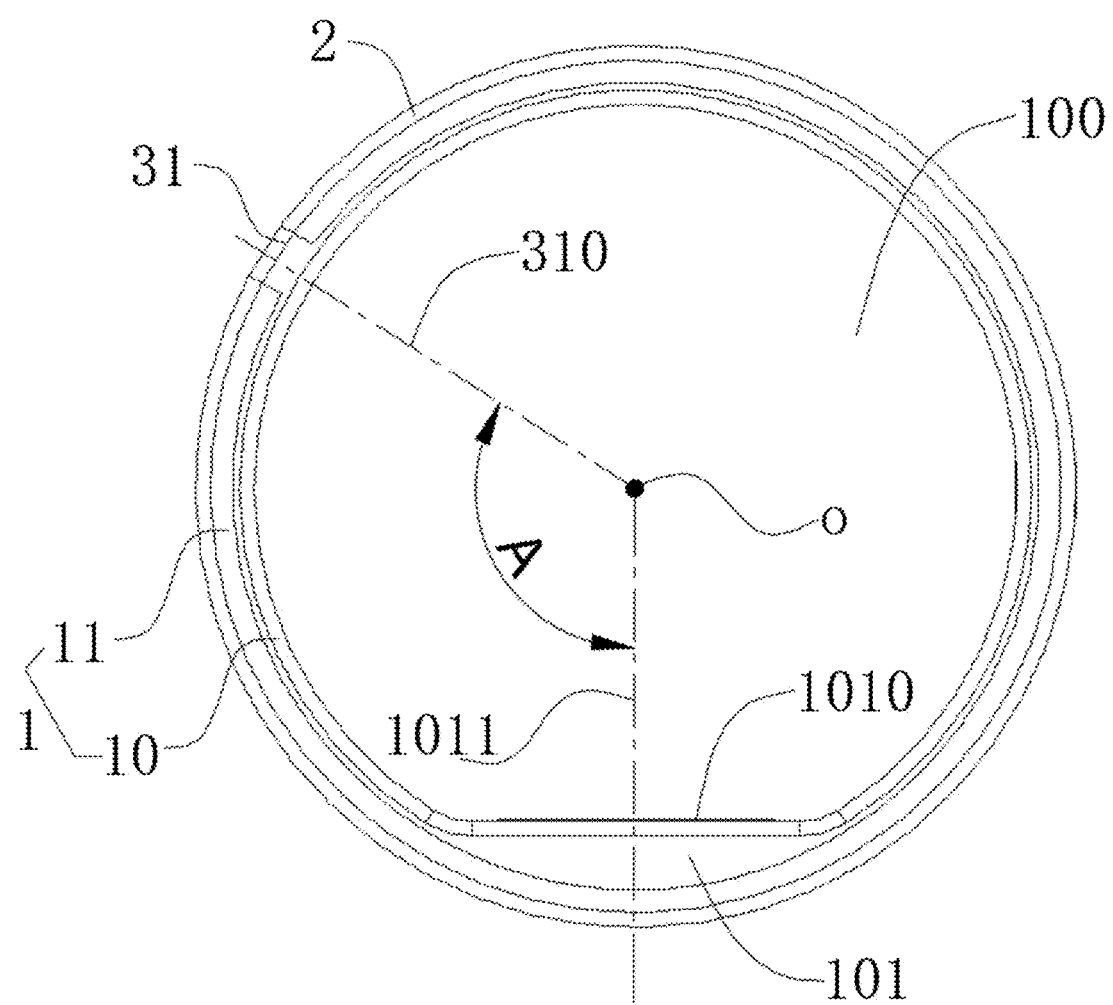
FIG. 1 is a main view of a smart ring according to an embodiment of the present invention.

In a preferred embodiment, the circuit board 3 further includes an optical sensor 34 (as shown by the reference numeral in FIG. 6). The optical sensor 34 may be, for example, a blood oxygen sensor for detecting blood oxygen saturation, a heart rate sensor for detecting a heart rate, or a blood oxygen and heart rate sensor capable of detecting both the blood oxygen saturation and the heart rate. Referring to FIG. 1 to FIG. 3, the inner housing 10 is provided with a boss 101 protruding toward a central hole 100 of the inner housing 10. A position of the optical sensor 34 corresponds to a position of the boss 101, to be specific, the optical sensor 34 is installed at a position corresponding to the boss 101 in the accommodating cavity 13. A window 102 through which light from the optical sensor 34 passes is further provided on an upper surface 1010 of the boss 101, so that the optical sensor 34 can detect signs of the human body. Because the boss 101 fit more tightly with the finger pad, a detection result of the optical sensor 34 is more accurate, and the measurement effect is not affected by existence of gaps.

When the smart ring is worn on the finger, the finger is inserted in the central hole 100 of the inner housing 10, and is in contact with a hole wall of the central hole 100. Because the boss 101 protrudes into the central hole 100, the boss 101 can be pressed against the finger, so that the smart ring is fixed more stably and is not prone to deflection.

Further, because the finger is not in a regular circle, and the finger pad is soft, when the smart ring is worn, the boss 101 can better fit the finger pad, is not easily loosen, is more comfortable to wear, and also has a better positioning effect. Specifically, when being worn, the boss 101 fits the finger pad toward the upper surface 1010 of the central hole 100. In a preferred embodiment, the upper surface 1010 is a planar surface. In this case, it is more convenient to process holes and mount electronic components on the upper surface 1010, and the upper surface 1010 is preferably transitioned to the inner wall of the inner housing 10 through a circular arc.

Figure 7:
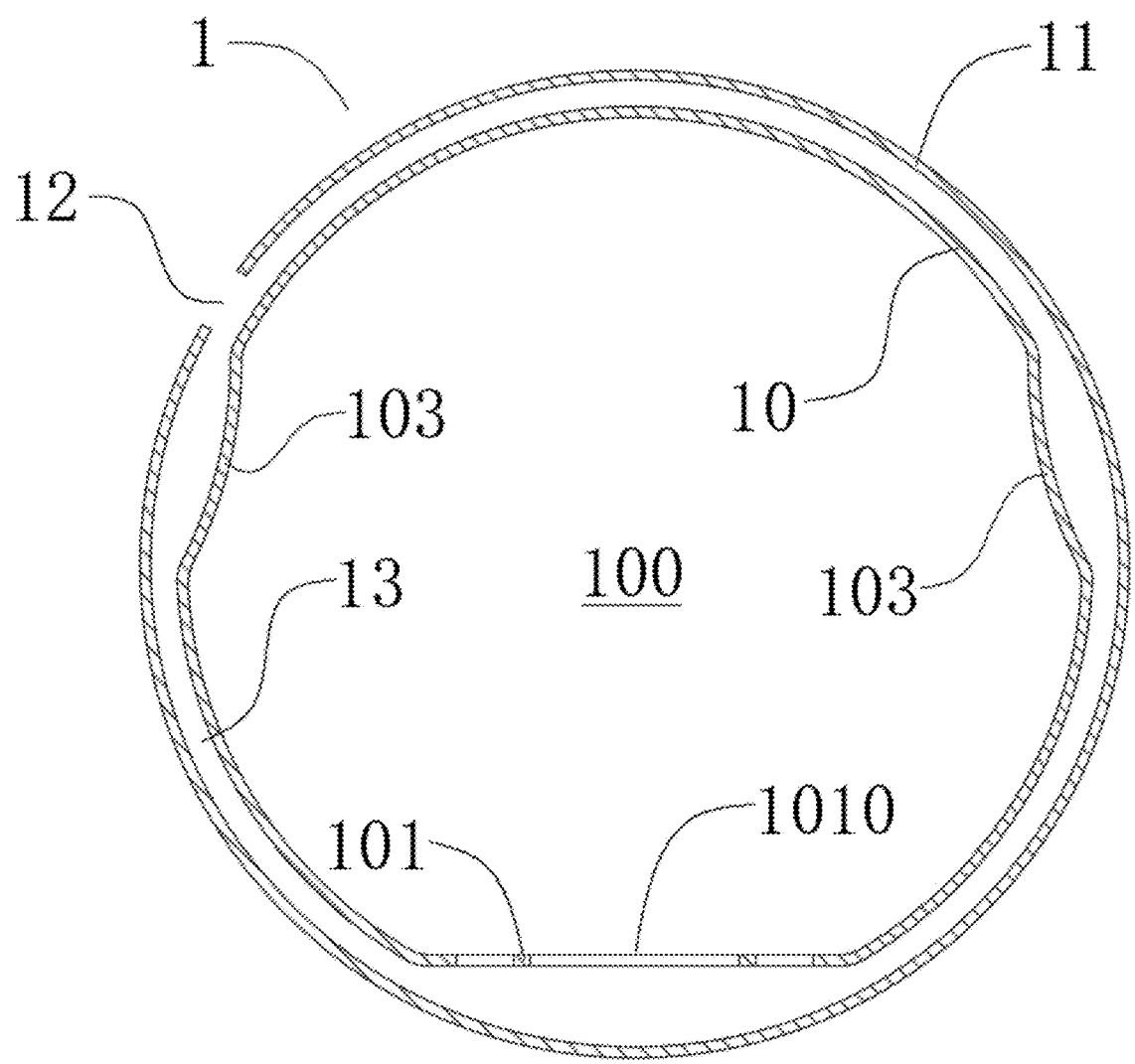
FIG. 7 is a cross-sectional view of a body according to an embodiment of the present invention, where two protrusions are shown in the figure.

In some embodiments, the inner housing 10 may be further provided with one or more protrusions 103 protruding toward the central hole 100. Referring to FIG. 7, FIG. 7 shows a case in which one protrusion 103 is provided on each side obliquely above the boss 101. In this case, a surface of the protrusion 103 is an outwardly protruding arc surface. When the smart ring is worn, the protrusion 103 is in contact with a side or top surface of the finger, and a sensor that has a large volume or needs to fit closely with the finger may be installed at a position corresponding to the protrusion 103 in the accommodating cavity 13, to facilitate installation or make the detection result more accurate. In addition, the arrangement of the protrusion 103 can further improve the position limiting effect of the smart ring on the finger.

It may be understood that the sign detection sensor is not limited to the optical sensor 34 described above. For example, referring to FIG. 6, one or more of a temperature sensor 34a, a blood pressure sensor 34b, or other sign sensors may further be arranged on the circuit board 3. When there is a surplus space at the position corresponding to the boss 101 in the accommodating cavity 13, the temperature sensor 34a and the blood pressure sensor 34b may further be disposed at this position, so that the temperature sensor 34a and the blood pressure sensor 34b are closer to or in tighter contact with the finger pad, and the detection result is more accurate. Data detected by the optical sensor 34 and other sensors may be stored in the storage module 36 for subsequent retrieval and viewing.

In a preferred embodiment, the circuit board 3 further includes a charging module 35 electrically connected to the battery 4. The charging module 35 is configured to charge the battery 4, and is arranged corresponding to the boss 101, to be specific, the charging module 35 is arranged at a position corresponding to the boss 101 in the accommodating cavity 13. A charging port 104 corresponding to an electrode of the charging module 35 is provided on the upper surface 1010 of the boss 101. During charging, an electrode of a charger may contact the electrode of the charging module 35 through the charging port 104, thereby charging the battery 4. Preferably, a quantity of charging ports 104 is two, and the two charging ports 104 are respectively located on both sides of the window 102. Further preferably, the charger and the smart ring may be magnetically attracted together, and charging is more convenient. A charging indicator light may further be arranged on front and rear surfaces of the boss 101, to facilitate display of a charging status.

The smart ring further includes a display apparatus 31 arranged on the circuit board 3 to facilitate observation of the detected data. In a preferred embodiment, the display apparatus 31 is a display screen (for example, an LED display screen). The display apparatus 31 is electrically connected to the microprocessor 30, and is capable of displaying data detected by the sensor, such as displaying blood oxygen and/or heart rate data detected by the optical sensor 34, or body temperature data detected by the temperature sensor, so that it is more convenient to view the detected data in real time. In addition to displaying the data detected by the sensor, the display screen 31 may further display a status of the smart ring, such as display whether the system is normal, a remaining capacity of the storage module, and remaining battery power. Preferably, the display apparatus 31 may indicate a physical condition of a user through information such as color, text, or picture. In another preferred embodiment, the display apparatus 31 is an indicator light. The indicator light can convey corresponding information through change in color or through a flashing frequency. For example, when a red light is turned on, it indicates that the heart rate is extremely high.

Referring to FIG. 1, the display apparatus 31 has a first symmetrical plane 310 passing through a central axis O of the body 1, and the boss 101 has a second symmetrical plane 1011 passing through the central axis of the body 1. An angle A between the first symmetrical plane 310 and the second symmetrical plane 1011 is 90° to 180°, so that people can conveniently view the information displayed by the display apparatus 31. When the angle A between the first symmetrical plane 310 and the second symmetrical plane 1011 is 180°, the display apparatus 31 and the boss 101 are respectively located at upper and lower ends of the body 1. When the palm is placed downward, the display apparatus 31 is located above the finger, and the boss 101 is located below the finger, so that the display apparatus 31 can be easily viewed.

Further preferably, the angle A between the first symmetrical plane 310 and the second symmetrical plane 1011 is 120° to 160°. In this way, when viewing the display apparatus 31, the user only needs to raise the hand slightly to directly view the display apparatus 31, so that viewing is more comfortable, and adverse effects such as reflections are not easily caused. It may be understood that, after the smart ring is worn, the display apparatus 31 is located on a side of the smart ring close to the thumb, thereby facilitating viewing. The boss 101 can perform a positioning function, and can prevent the smart ring from being deflected too flexibly, thereby ensuring fixation of the position of the display apparatus 31.

Figure 8:
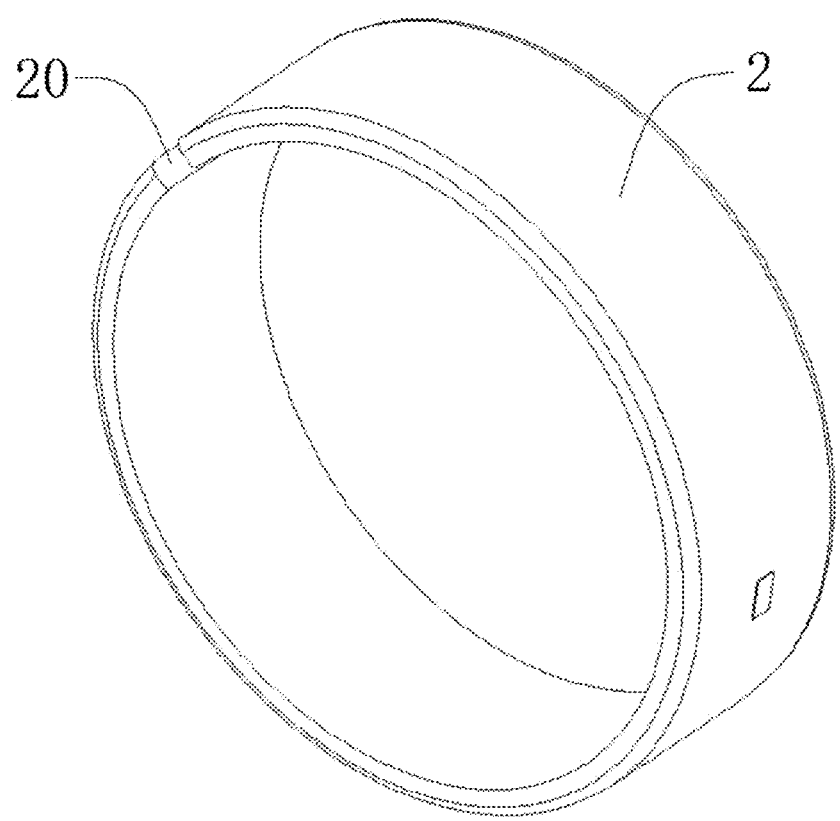
FIG. 8 is a schematic structural diagram of a decorative housing according to an embodiment of the present invention.
Figure 9:
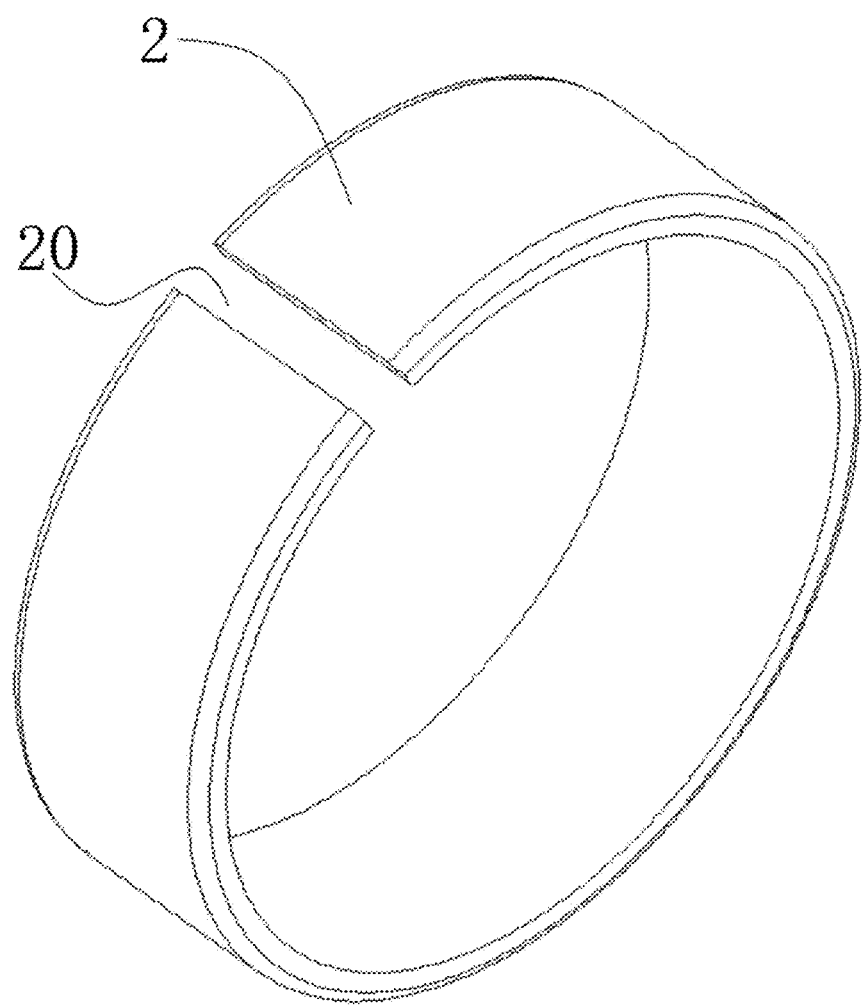
FIG. 9 is a schematic structural diagram of the decorative housing shown in FIG. 8 from another view.

In a further improvement, referring to FIG. 1, FIG. 8, and FIG. 9, the smart ring further includes a decorative housing 2 arranged around an outer circumference of the outer housing 11 of the body 1. The decorative housing 2 may be made of a material same as or similar to a material of an ordinary ring, such as gold, silver, or platinum, to make its appearance closer to the ordinary ring and more aesthetic. It is clear that, the smart ring may alternatively be made of other materials such as plastic. Diamonds or other ornaments may further be arranged on the decorative housing 2 to further improve the aesthetics. In addition, the decorative housing 2 arranged around the outer circumference of the body 1 can better protect the body 1. For example, tapping on the decorative housing 2 to generate the vibration signal can prevent directly tapping on the outer housing 11 of the body 1. A connection manner between the decorative housing 2 and the body 1 is not limited. For example, the decorative housing 2 and the body 1 may be connected by welding, bonding, buckle connection, or the like, or may be detachably connected, to facilitate replacement after the decorative housing 2 is worn.

To enable the display apparatus 31 to be exposed from the decorative housing 2, as shown in FIG. 2, the body 1 is provided with a first clearance hole 12, and as shown in FIG. 8 and FIG. 9, the decorative housing 2 is provided with a second clearance hole 20 corresponding to a position of the first clearance hole 12. The display apparatus 31 is convex from the circuit board 3 into the first clearance hole 12 and the second clearance hole 20, so that the display apparatus 31 can be conveniently observed from the outside of the smart ring. The first clearance hole 12 preferably penetrates both sides of the body 1, and the second clearance hole 20 preferably penetrates both sides of the decorative housing 2, to facilitate assembly of the outer housing 11 and the decorative housing 2.

In a preferred embodiment, the display apparatus 31 is flush with an outer surface of the decorative housing 2. In another preferred embodiment, the display apparatus 31 is located in the decorative housing 2, and a transparent part corresponding to the display apparatus 31 is provided on the decorative housing 2, so that light of the display apparatus 31 can be emitted from the transparent part.

To enable the smart ring to reliably transmit and receive signals and reduce signal shielding generated due to the housing, an antenna 38 is arranged on the circuit board 3. Referring to FIG. 3, the antenna 38 is arranged on a side surface of the display apparatus 31 and is arranged in both the first clearance hole 12 and the second clearance hole 20, so that the smart ring can transmit and receive signals more stably and reliably.

To make the smart ring have better user experience, the smart ring further has a vibration feedback function. In a preferred embodiment, the smart ring further includes an actuator 37 arranged on the circuit board 3, the actuator 37 may be, for example, a vibration motor or a piezoelectric ceramic. Preferably, the actuator 37 is a piezoelectric ceramic, is capable of generating vibration through an inverse piezoelectric effect, and is capable of being formed in a thin film shape, so that it is more convenient to be installed in the accommodating cavity 13. In another preferred embodiment, the vibration sensor 300 is a piezoelectric ceramic sensor. The vibration sensor 300 can not only generate an electrical signal (for example, a vibration signal) due to deformation when being tapped, but also generate a vibration when applying a voltage, and can be used as both the vibration sensor and the actuator, saving components and further simplifying the structure.

When the user sends a control instruction by tapping the ring or moving the ring, the microprocessor 30 may determine whether to recognize the corresponding instruction. When the instruction is recognized, the smart ring may be controlled to generate, for example, a short vibration to respond to successful instruction recognition. When the instruction is not recognized successfully, the smart ring may be controlled to generate, for example, a long vibration to make the user aware that the instruction is not recognized. This can remind the user to resend the control instruction, and has better user experience.

In addition, the smart ring may further vibrate according to a feedback signal sent by an external electrical device, to confirm whether the information sent by the smart ring is confirmed or whether the instruction is recognized. For example, when the smart ring sends an instruction of controlling to unlock a car door, if the car door is successfully unlocked, a vehicle control system may send a feedback signal of successful unlocking to the smart ring in this case. After the smart ring receives the feedback signal, the microprocessor 30 may control the smart ring to vibrate, to feed back the information of successful unlocking.

In a feasible scenario, the smart ring may be worn on a finger of a patient. The smart ring may communicate with a cloud platform of a hospital, and can send detected sign parameters of the patient to the cloud platform, so that it is convenient for medical staff to view the sign parameters of the patient. When the patient needs the help of the medical staff, the patient may tap the smart ring. The smart ring sends a help request signal to a terminal of the medical staff, and the medical staff may click "confirm". In this case, the terminal sends a feedback signal to the smart ring, and the smart ring generates a vibration to indicate that the help request is confirmed. It is clear that, different tapping methods may represent different messages, for example, tapping twice indicates calling people to come quickly; and tapping three times indicates requesting for rescue. In other scenarios, the smart ring may alternatively be worn on a finger of an elderly. The smart ring is communicatively connected with terminals such as mobile phones of children of the elderly or other nursing staff. When the elderly falls or is unwell, the ring may be tapped to send out a help request signal. Because tapping the ring is very convenient, it is convenient to be used by an elderly who do not know how to use electronic devices.

Based on different signals fed back by the external electrical device, the vibration generated by the smart ring may also be different. For example, when the control instruction is confirmed or executed by the electrical device, the smart ring may vibrate briefly once; when the control instruction is not recognized or not executed by the electrical device, the smart ring may vibrate consecutively at an interval. In this way, after sending an instruction, the user can learn, depending on the vibration feedback, whether the instruction sent by the user is executed, and the use is more convenient and comfortable. Similarly, a vibration control instruction corresponding to the feedback signal may be stored in the storage module 36, and after receiving the feedback signal, the microprocessor 30 may obtain the vibration control instruction corresponding to the feedback signal through a mapping relationship, thereby controlling the vibration of the smart ring.

Because a plurality of sensors are arranged on the circuit board 3, an appropriate layout is particularly necessary. In a preferred layout manner, referring to FIG. 5, a plurality of mounting positions are arranged on the circuit board 3, and the plurality of mounting positions are roughly arranged in two rows. Specifically, an optical sensor mounting position 3*a* is provided at one end of the circuit board 3, and an actuator mounting position 3*c* is provided on an adjacent side of the optical sensor mounting position 3*a*, so that a position of the actuator 37 is corresponding to the boss 101, and vibration can be transmitted to the finger more directly. Correspondingly, a temperature sensor mounting position 3*d*, a microprocessor mounting position 3*e*, and a wireless communication module mounting position 3*f* are sequentially arranged on the same row as the optical sensor mounting position 3*a*. An inertial sensor mounting position 3*g* is provided on a side adjacent to the microprocessor mounting position 3*e*, and a vibration sensor mounting position 3*h* is provided on a side adjacent to the temperature sensor mounting position 3*d*.

Referring to FIG. 5, the entire battery 4 is disposed in an arc shape, an end portion of the battery 4 is connected to the circuit board 3, and the whole formed by the two is substantially annular. This can facilitate the installation of the battery 4, and can increase the volume and power of the battery 4 by making full use of the space of the accommodating cavity 13, thereby prolonging service time of the smart ring.

Figure 10:
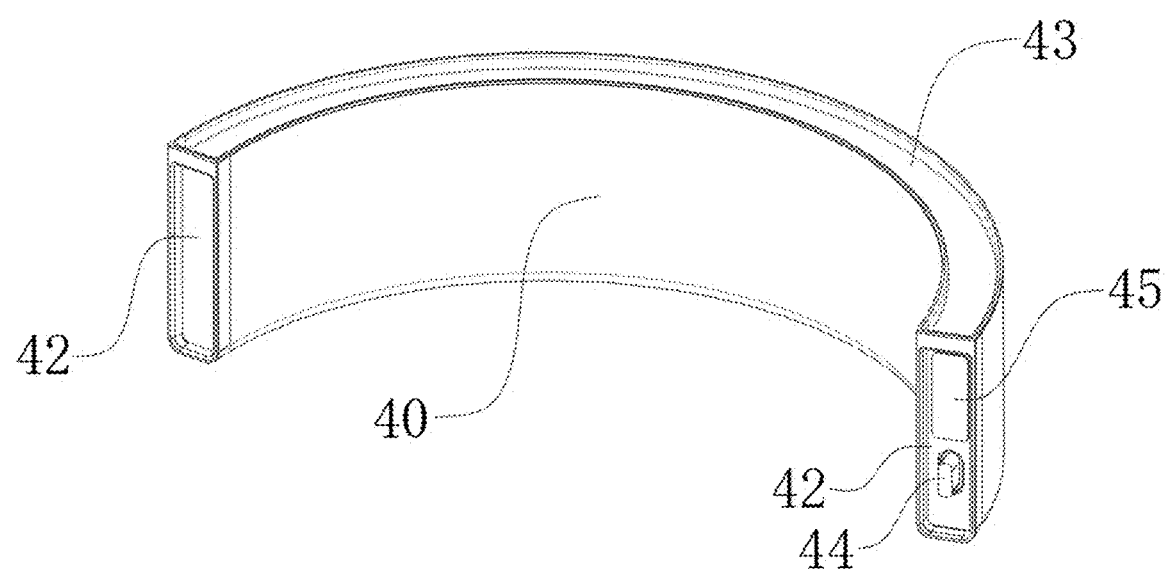
FIG. 10 is a schematic structural diagram of a battery according to an embodiment of the present invention.
Figure 11:
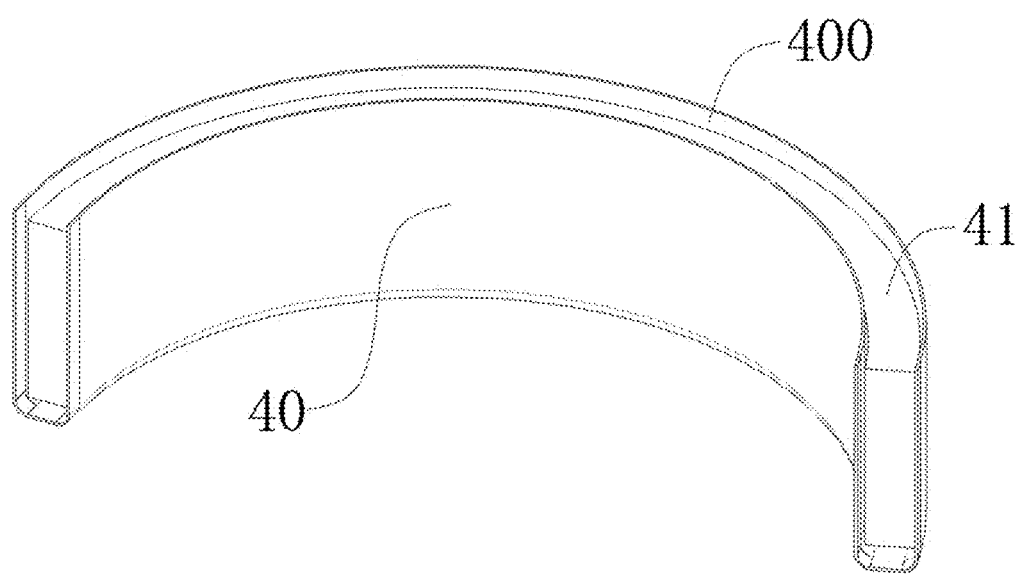
FIG. 11 is a schematic diagram of positions of an arc-shaped housing and a battery core according to an embodiment of the present invention.

In a preferred embodiment, referring to FIG. 10 and FIG. 11, the battery 4 includes an arc-shaped housing 40, a battery core 41 disposed within the arc-shaped housing 40, an end cover 42 connected to an end portion of the arc-shaped housing 40, a top cover 43 connected to an upper end of the arc-shaped housing 40, and an electrode assembly 44 electrically connected to the battery core 41, where the electrode assembly 44 is connected to the end cover 42.

Referring to FIG. 11, the arc-shaped housing 40 is provided with an arc-shaped inner cavity 400 communicating two ends and the top part of the arc-shaped housing 40, and the top cover 43 is connected to the upper end of the arc-shaped housing 40 by laser welding for sealing the top part of the arc-shaped housing 40. The quantity of end covers 42 is two, each sealing both ends of the arc-shaped housing 40, and the electrode assembly 44 is connected to one of the end covers 42. It may be understood that, only one end cover 42 is needed when only one end of the arc-shaped housing 40 is open.

Because a size of the smart ring is small, a size of the battery 4 inside the smart ring is smaller, an electrode 441 of the electrode assembly 44 easily contact the end cover 42, and it is difficult to ensure insulation performance.

Figure 12:
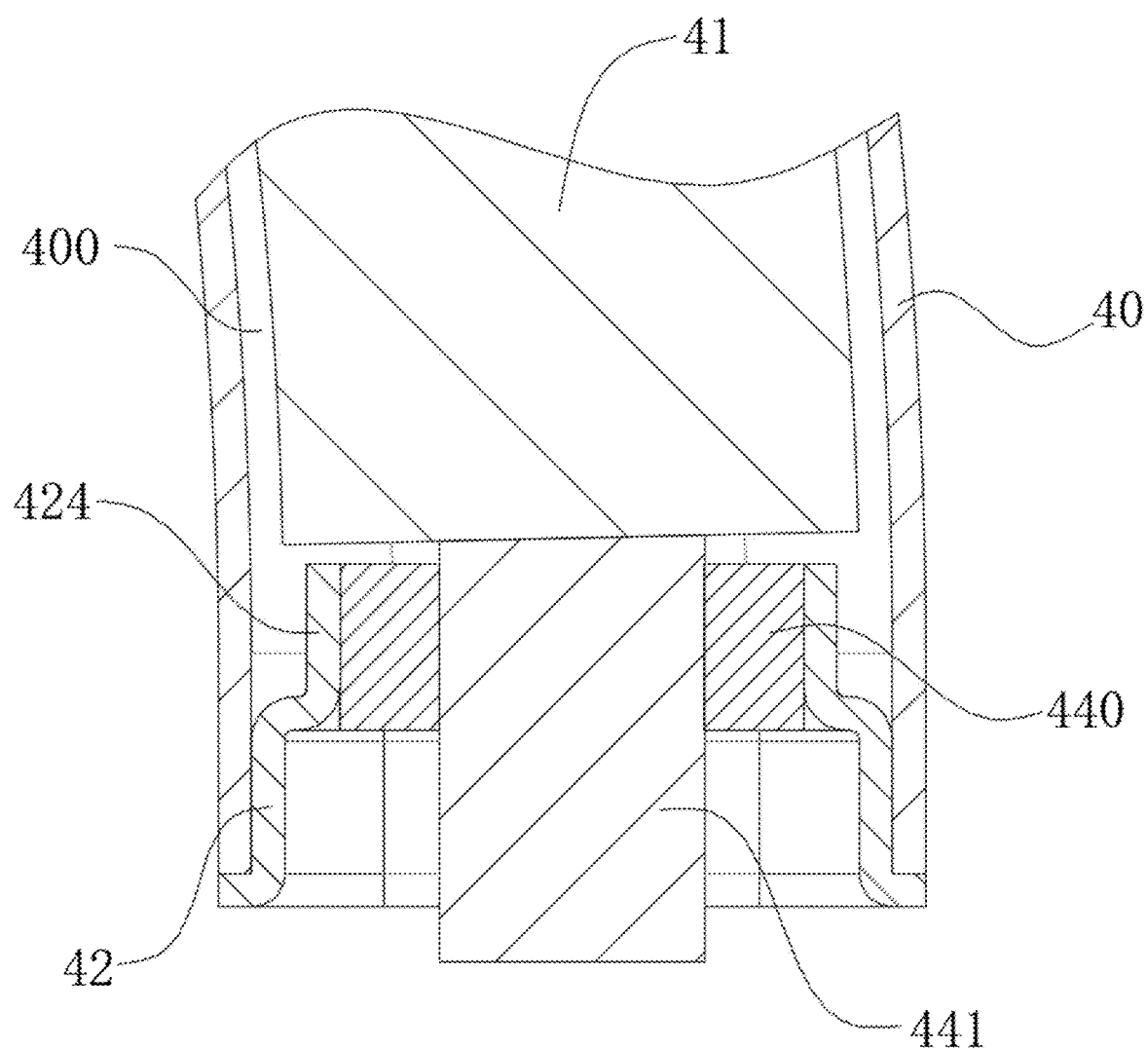
FIG. 12 is a cross-sectional view of a connection between an electrode assembly and an end cover according to an embodiment of the present invention.

In a preferred embodiment, referring to FIG. 12, the end cover 42 is provided with a convex ring 424 in communication with the inner cavity 400 of the arc-shaped housing 40, and the convex ring 424 extends into the inner cavity 400. The electrode assembly 44 includes a glass ring 440 provided within the convex ring 424 and the electrode 441 arranged within the glass ring 440. The glass ring 440 is formed between the electrode 441 and the convex ring 424 by glass sintering, to reliably separate the electrode 441 and the end cover 42, which is conducive to ensuring the stability of the electrode 441. In this embodiment, a material of the electrode 441 is preferably molybdenum.

Figure 13:
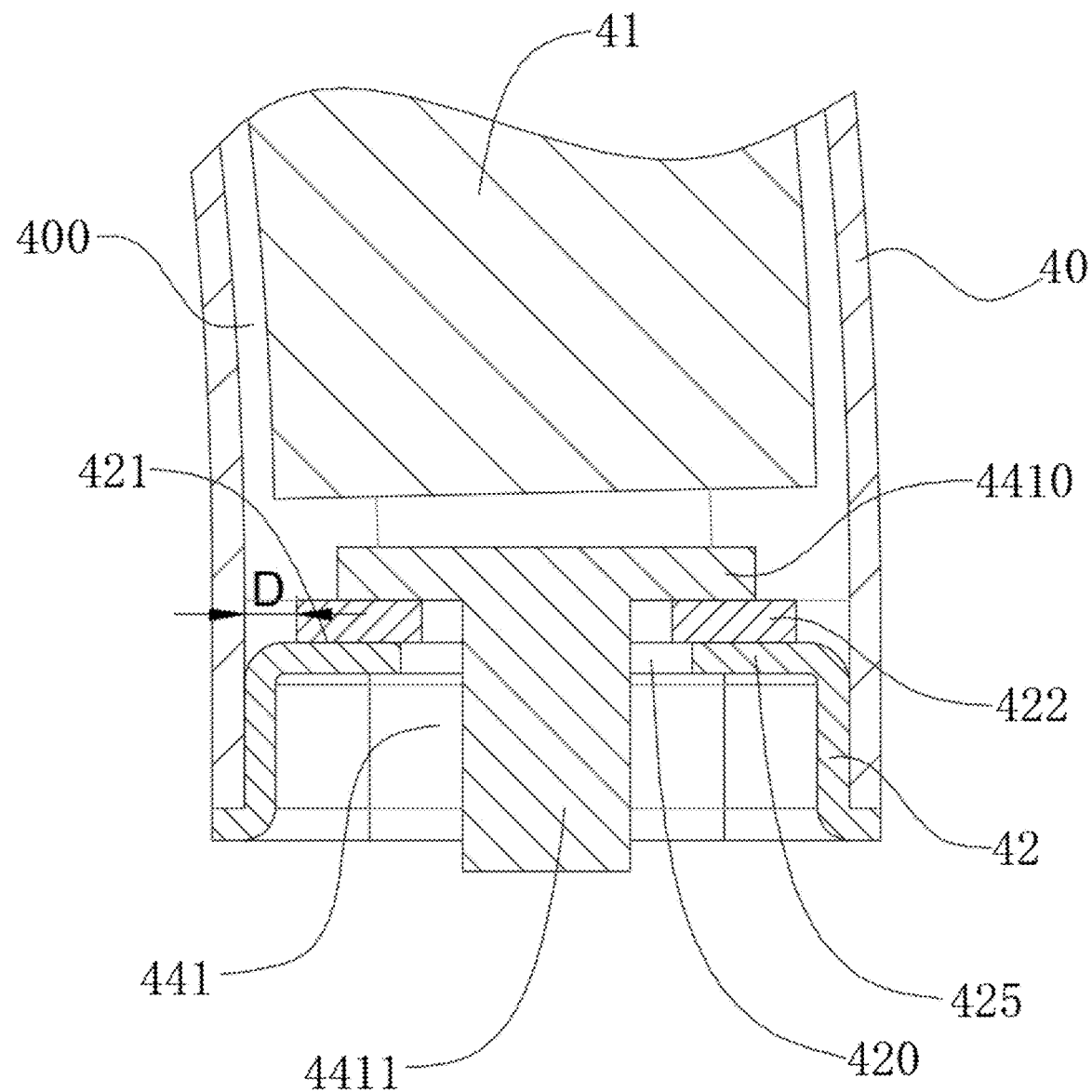
FIG. 13 is a cross-sectional view of a connection between an electrode assembly and an end cover according to another embodiment of the present invention.

In another preferred embodiment, referring to FIG. 13, the end cover 42 is provided with a through hole 420, the electrode assembly 44 includes an adhesive layer 422 connected to an inner side 421 of the end cover 42 and an electrode 441 connected to the adhesive layer 422, the electrode 441 includes a plate body 4410 and an electrode post 4411 protruding from the plate body 4410, the electrode post 4411 is inserted in the through hole 420, and there is a gap between the electrode post 4411 and a hole wall of the through hole 410, and the two are not in contact with each other. The adhesive layer 422 is insulating, and can isolate the plate body 4410 and the electrode post 4411, to ensure the insulation performance. In this embodiment, the adhesive layer 422 is preferably PP adhesive, the plate body 4410 and the end cover 42 are connected through hot melting, and a material of the electrode 441 is preferably aluminum. Further, because the end cover 42 and the arc-shaped housing 40 need to be laser-welded, the adhesive layer 422 is easily melted by heat during a welding process, thereby causing the plate body 4410 to come into contact with the end cover 42 and affecting the reliability of the electrode 441. Therefore, a distance D between an outer edge of the adhesive layer 422 and an outer edge of a substrate 425 on which the electrode 441 is mounted on the end cover 42 is set to greater than or equal to 0.1 mm, so that the impact of the laser welding on the adhesive layer 422 is less, and the insulation effect and sealing effect of the adhesive layer 422 are ensured. Further preferably, the distance D between the outer edge of the adhesive layer 422 and the outer edge of the substrate 425 is set to 0.1 mm to 0.5 mm, so that a sufficient area of the adhesive layer 422 can be connected to the plate body 4410 while reducing the impact of the laser welding on the adhesive layer 422, to ensure firmness of the connection.

Figure 14:
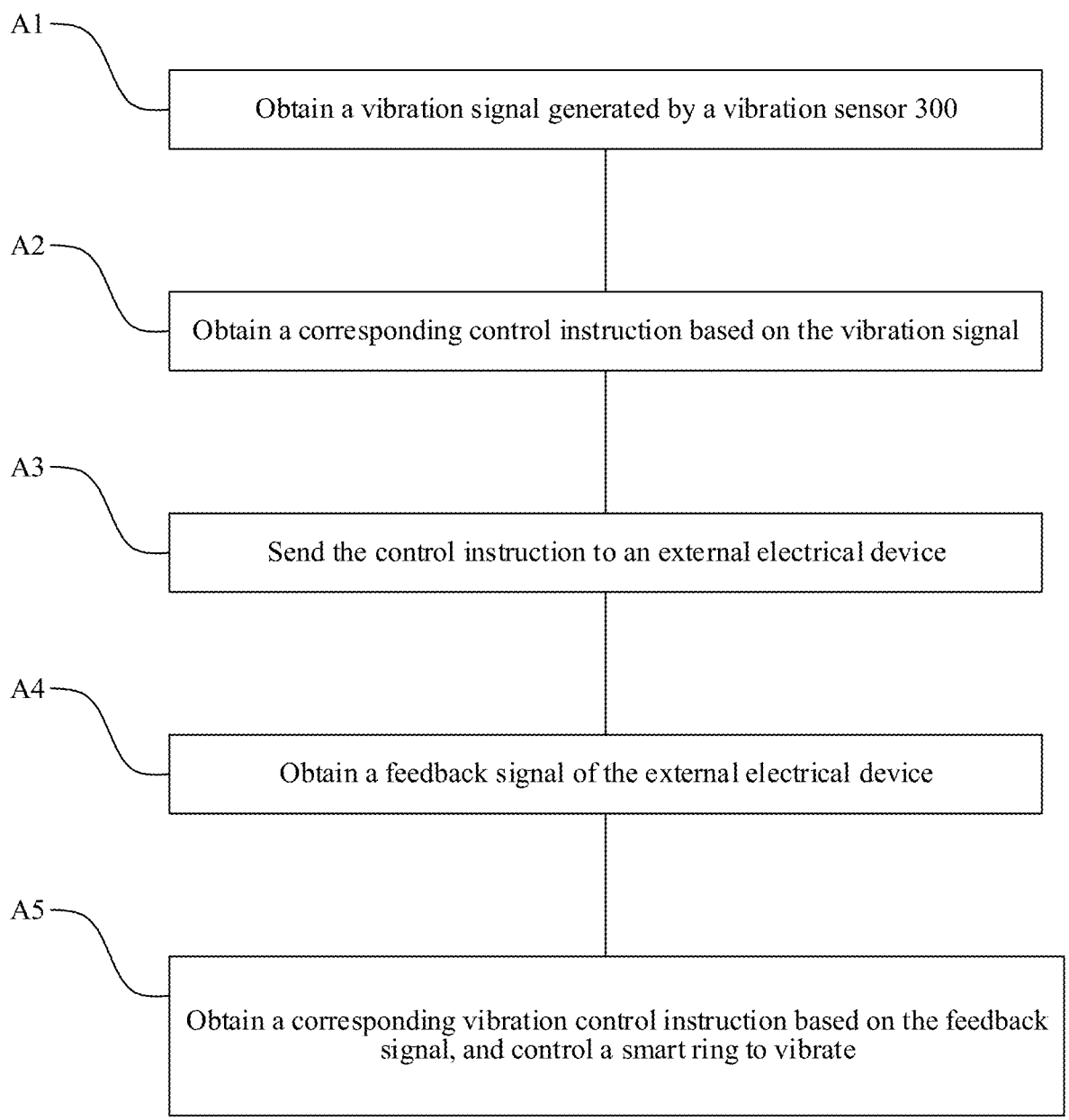
FIG. 14 is a flowchart of a control method of a smart ring according to an embodiment of the present invention.

In some embodiments, the electrode 441 is the positive electrode of the battery 4. As shown in FIG. 10, a metal sheet 45 is arranged on the end cover of the battery 4 on which the electrode 441 is arranged, and the metal sheet 45 is used as the negative electrode of the battery 4. The present invention further proposes a control method of the smart ring described above, referring to FIG. 14, the method includes the following steps:

A1. Obtain a vibration signal generated by the vibration sensor 300.

A2. Obtain a corresponding control instruction based on the vibration signal.

A3. Send the control instruction to an external electrical device.

In the foregoing steps A1 to A3, the smart ring may be tapped, so that the vibration sensor 300 senses a vibration signal. After the vibration signal is obtained by the microprocessor 30, a corresponding control instruction is obtained through calculation, and is transmitted to the external electrical device through the wireless communication module 33, to further control the electrical device. As described above, different vibration signals may be generated through different tapping manners, and then different control instructions can be obtained.

It may be understood that the vibration signal needs to match or basically match a preset signal to obtain a corresponding control instruction, to avoid generating the control instruction when the smart ring is tapped accidentally. When the smart ring is accidentally tapped to generate the vibration signal, the vibration signal usually does not match the preset vibration signal, and the control instruction is not sent in this case, to reduce the problem of accidentally sending control instructions.

Further, the control method of the smart ring described above further includes the following steps:

A4. Obtain a feedback signal of the external electrical device.

A5. Obtain a corresponding vibration control instruction based on the feedback signal, and control the smart ring to vibrate.

In the foregoing step A4, the external electrical device sends a feedback signal based on a reception status and/or an execution status of the control instruction, and the feedback signal is received by the wireless communication module 33 of the smart ring and obtained by the microprocessor 30.

In the foregoing step A5, the microprocessor 30 obtains a corresponding vibration control instruction based on the obtained feedback signal, and then controls the vibration of the smart ring, for example, causes the smart ring to vibrate by controlling vibration of the actuator 37. For different feedback signals of the electrical device, vibration feedback is also different. For example, when the control instruction is confirmed and executed by the electrical device, the smart ring may vibrate briefly once; when the control instruction is not recognized or not executed by the electrical device, the smart ring may vibrate consecutively at an interval. In this way, after sending an instruction, the user can learn, depending on the vibration feedback, whether the instruction sent by the user is executed, and the use is more convenient and comfortable.

Figure 15:
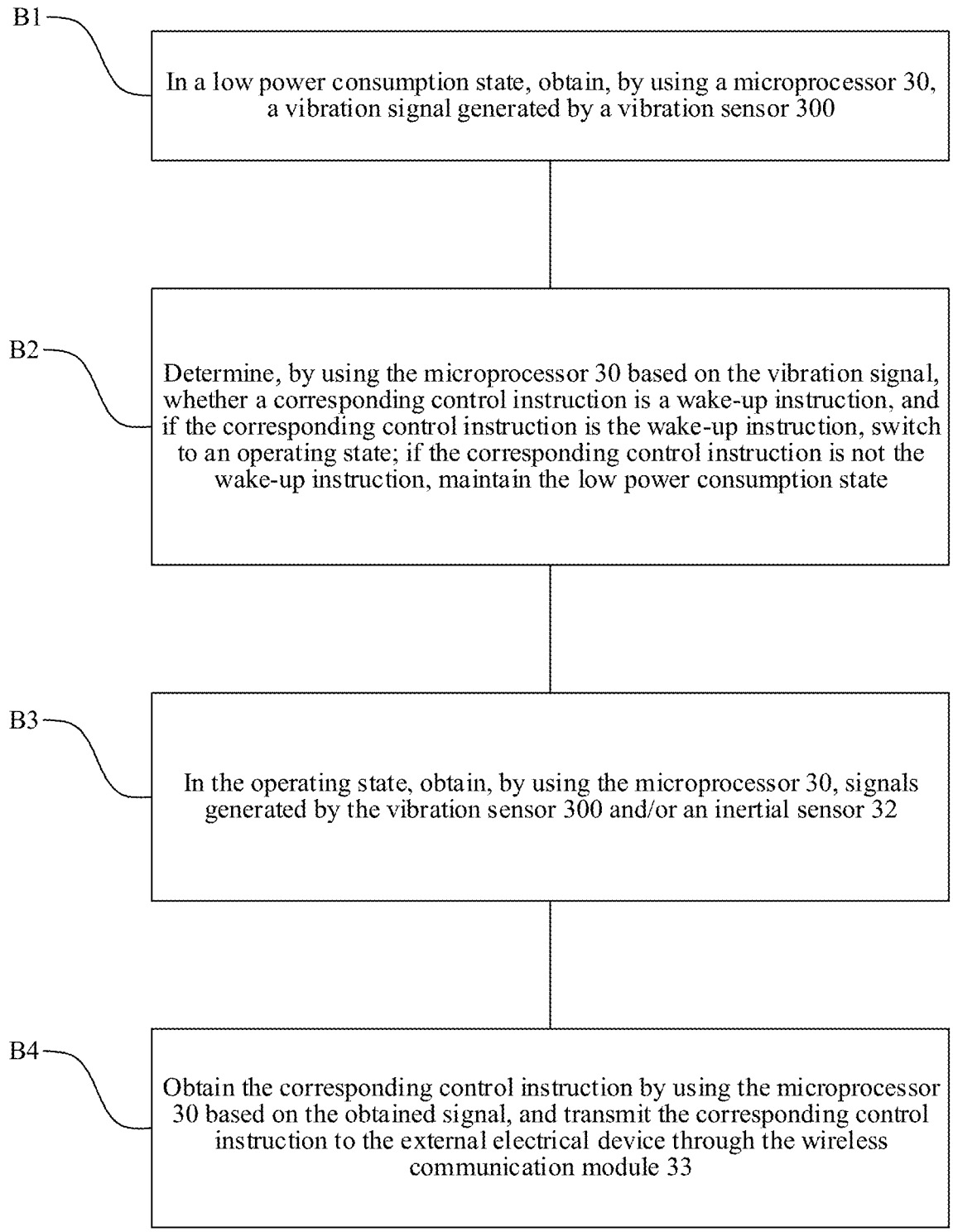
FIG. 15 is a flowchart of a control method of a smart ring according to an embodiment of the present invention.

In a preferred embodiment, the smart ring may include a low power consumption state and an operating state. When in the low power consumption state, the smart ring may maintain signal monitoring by the microprocessor 30 on the vibration sensor 300, while other sensors or functional modules (such as the wireless communication module 33) are in an inactive state. This can reduce power consumption and prolong use time of the smart ring. In this embodiment, referring to FIG. 15, the control method of the smart ring includes the following steps:

B1. In the low power consumption state, obtain, by using the microprocessor 30, a vibration signal generated by the vibration sensor 300.

B2. Determine, by using the microprocessor 30 based on the vibration signal, whether a corresponding control instruction is a wake-up instruction, and if the corresponding control instruction is the wake-up instruction, switch to an operating state; if the corresponding control instruction is not the wake-up instruction, maintain the low power consumption state.

B3. In the operating state, obtain, by using the microprocessor 30, a signal generated by the vibration sensor 300 and/or a signal generated by the inertial sensor 32.

B4. Obtain the corresponding control instruction by using the microprocessor 30 based on the obtained signal, and transmit the corresponding control instruction to the external electrical device through the wireless communication module 33.

In steps B1 and B2, in the low power consumption state, the microprocessor 30 maintains monitoring on the vibration sensor 300. When the vibration sensor 300 generates a vibration signal due to tapping or the like, the microprocessor 30 determines, based on the vibration signal, whether the corresponding control instruction is a wake-up instruction. For example, the microprocessor 30 obtains a control instruction corresponding to the vibration signal based on a mapping relationship between the vibration signal and the control instruction, and when the control instruction is the wake-up instruction, the microprocessor 30 switches the smart ring to the operating state.

In step B3, after the smart ring is switched to the operating state, in this case, the smart ring may be tapped to send a needed instruction, or the smart ring may be moved to send a needed instruction, or a needed instruction may be sent through a combination of tapping the smart ring and moving the smart ring. The signal generated by the vibration sensor 300 and/or the signal generated by the inertial sensor 32 is obtained by the microprocessor 30.

In step B4, the microprocessor 30 obtains the corresponding control instruction based on the obtained signal, for example, obtains a control instruction corresponding to the vibration signal and/or the trajectory signal through the mapping relationship, then sends the control instruction to the external electrical device through the wireless communication module 33, and controls the external electrical device to perform a corresponding action. The corresponding control instruction may be sent by tapping the smart ring or moving the smart ring, so that the operation of the smart ring is more convenient and the functions are more diverse.

The foregoing describes only specific embodiments of the present invention, and any other improvements made based on the concept of the present invention shall fall within the protection scope of the present invention.

What is claimed is:

1. A smart ring, comprising:
a body, comprising an annular accommodating cavity;
a circuit board, arranged in the accommodating cavity, the circuit board comprising a microprocessor and a vibration sensor, an inertial sensor, and a wireless communication module that are electrically connected to the microprocessor, the wireless communication module being communicatively connected with an external electrical device, and the microprocessor being configured to obtain a corresponding control instruction based on a signal generated by the vibration sensor and/or a signal generated by the inertial sensor; and
a battery, connected to the circuit board,
wherein the battery comprises an arc-shaped housing, a core arranged in the arc-shaped housing, an end cover connected to an end of the arc-shaped housing, and an electrode assembly electrically connected to the core, and the electrode assembly is connected to the end cover,
wherein the end cover is provided with a convex ring in communication with an inner cavity of the arc-shaped housing, and the electrode assembly comprises a glass ring provided within the convex ring and an electrode arranged within the glass ring.

2. The smart ring according to claim 1, wherein the body comprises an inner housing and an outer housing surrounding an outer circumference of the inner housing, and the accommodating cavity is formed between the inner housing and the outer housing.

3. The smart ring according to claim 2, wherein the inner housing is provided with a boss protruding toward a central hole of the inner housing.

4. The smart ring according to claim 3, wherein the boss comprises an upper surface configured for contact with a finger pad of a finger, and the upper surface is a planar surface.

5. The smart ring according to claim 3, wherein the smart ring further comprises one or more protrusions protruding toward the central hole, and the one or more protrusions are configured for contact with a side surface or a top surface of a finger.

6. The smart ring according to claim 3, wherein the circuit board further comprises an optical sensor arranged corresponding to the boss, and the boss is provided with a window through which light of the optical sensor passes.

7. The smart ring according to claim 3, wherein the circuit board further comprises a charging module arranged corresponding to the boss, and a charging port corresponding to an electrode of the charging module is provided on a surface of the boss.

8. The smart ring according to claim 3, wherein the circuit board further comprises a display apparatus electrically connected to the microprocessor.

9. The smart ring according to claim 8, wherein the smart ring further comprises a decorative housing surrounding an outer circumference of the body, the body is provided with a first clearance hole, the decorative housing is provided with a second clearance hole, and the display apparatus is located in the first clearance hole and the second clearance hole.

10. The smart ring according to claim 8, wherein an upper surface of the boss is configured to fit with a finger pad of a finger; and
the display apparatus has a first symmetrical plane passing through a central axis of the body, and the boss has a second symmetrical plane passing through the central axis of the body, and an angle A between the first symmetrical plane and the second symmetrical plane ranges from 90° to 180°.

11. The smart ring according to claim 10, wherein the angle A between the first symmetrical plane and the second symmetrical plane ranges from 120° to 160°.

12. The smart ring according to claim 1, wherein the circuit board further comprises a storage module electrically connected to the microprocessor, and the storage module is configured to store control instructions corresponding to signals sensed by the vibration sensor and the inertial sensor.

13. The smart ring according to claim 1, wherein the circuit board further comprises an actuator electrically connected to the microprocessor, and the actuator is configured to vibrate according to an instruction of the microprocessor; or
the vibration sensor is a piezoelectric ceramic sensor, and the piezoelectric ceramic sensor is configured to vibrate according to an instruction of the microprocessor.

14. A smart ring, comprising:
a body, comprising an annular accommodating cavity;
a circuit board, arranged in the accommodating cavity, the circuit board comprising a microprocessor and a vibration sensor, an inertial sensor, and a wireless communication module that are electrically connected to the microprocessor, the wireless communication module being communicatively connected with an external electrical device, and the microprocessor being configured to obtain a corresponding control instruction based on a signal generated by the vibration sensor and/or a signal generated by the inertial sensor; and
a battery, connected to the circuit board,
wherein the battery comprises an arc-shaped housing, a core arranged in the arc-shaped housing, an end cover connected to an end of the arc-shaped housing, and an electrode assembly electrically connected to the core, and the electrode assembly is connected to the end cover,
wherein the end cover is laser-welded to the arc-shaped housing, the end cover is provided with a through hole, the end cover is provided with an inner surface facing an inner cavity of the arc-shaped housing, the electrode assembly comprises an adhesive layer connected to the inner surface and an electrode connected to the adhesive layer, the electrode comprises a plate body and an electrode post protruding from the plate body, and the electrode post is inserted in the through hole.

15. The smart ring according to claim 14, wherein a distance between an outer edge of the adhesive layer and an outer edge of the end cover is greater than or equal to 0.1 mm.

16. A control method of the smart ring according to claim 1, comprising the following steps:
obtaining a vibration signal generated by the vibration sensor;
obtaining a corresponding control instruction based on the vibration signal; and
sending the control instruction to an external electrical device.

17. The control method of the smart ring according to claim 16, further comprising the following steps:
obtaining a feedback signal of the external electrical device; and
obtaining a corresponding vibration control instruction based on the feedback signal, and controlling the smart ring to vibrate.

18. A control method of the smart ring according to claim 1, wherein the smart ring comprises a low power consumption state and an operating state, and the control method of the smart ring comprises the following steps:
- in the low power consumption state, obtaining, by using the microprocessor, a vibration signal generated by the vibration sensor;
- determining, by the microprocessor based on the vibration signal, whether a corresponding control instruction is a wake-up instruction, and if yes, switching to the operating state;
- in the operating state, obtaining, by the microprocessor, a signal generated by the vibration sensor and/or a signal generated by the inertial sensor; and
- obtaining, by the microprocessor, a corresponding control instruction based on the signals, and sending the control instruction to the external electrical device through the wireless communication module.

* * * * *